(12) United States Patent
Yu et al.

(10) Patent No.: US 12,711,169 B1
(45) Date of Patent: Aug. 18, 2026

(54) ENHANCED PTID PREDICTION AND ACCURATE FITMENT USING A PTID UNDERSTANDING MODEL

(71) Applicant: Walmart Apollo, LLC, Bentonville, AR (US)

(72) Inventors: Yang Yu, Cranbury, NJ (US); Varun Joshi, Jersey City, NJ (US); Cun Mu, New York, NY (US); Zheng Yan, Short Hills, NJ (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 19/085,586

(22) Filed: Mar. 20, 2025

(51) Int. Cl.

| | |
|---|---|
| ***G06F 16/00*** | (2019.01) |
| ***G06F 16/334*** | (2025.01) |
| ***G06F 16/335*** | (2019.01) |
| ***G06F 40/284*** | (2020.01) |

(52) U.S. Cl.
CPC ........ *G06F 16/3346* (2019.01); *G06F 16/335* (2019.01); *G06F 40/284* (2020.01)

(58) Field of Classification Search
None
See application file for complete search history.

(56) References Cited

U.S. PATENT DOCUMENTS

2022/0253447 A1* 8/2022 Boytsov ................ G06F 16/319
2022/0253871 A1* 8/2022 Miller ..................... G06F 16/36
2023/0113607 A1* 4/2023 Kang .................. G06F 16/3329 704/232
2025/0384062 A1* 12/2025 Russo .................. G06F 16/285

* cited by examiner

*Primary Examiner* — Anhtai V Tran
(74) *Attorney, Agent, or Firm* — FOLEY & LARDNER LLP

(57) ABSTRACT

A system includes a processor and a non-transitory computer-readable medium storing computing instructions that, when executed, perform operations including tokenizing a query. Tokens are transformed into embeddings. The embeddings are passed through a classification layer, producing log its. A sigmoid function is applied to convert the log its into a probability vector for Part Terminology Identifiers (PTIDs) associated with one or more domains. The probability vector is filtered to retain PTIDs based on respective probabilities satisfying a threshold. A sum of the probabilities is a predetermined sum value. The PTIDs are ranked by their probabilities. Business logic is applied to the ranked PTIDs using a PTID Understanding Model to determine a final result output to a fitment service. The PTID Understanding Model is pretrained to trigger a fitment determination process and/or a query results filter process for the one or more domains when the final result is valid.

19 Claims, 9 Drawing Sheets

FIG. 4G
Before
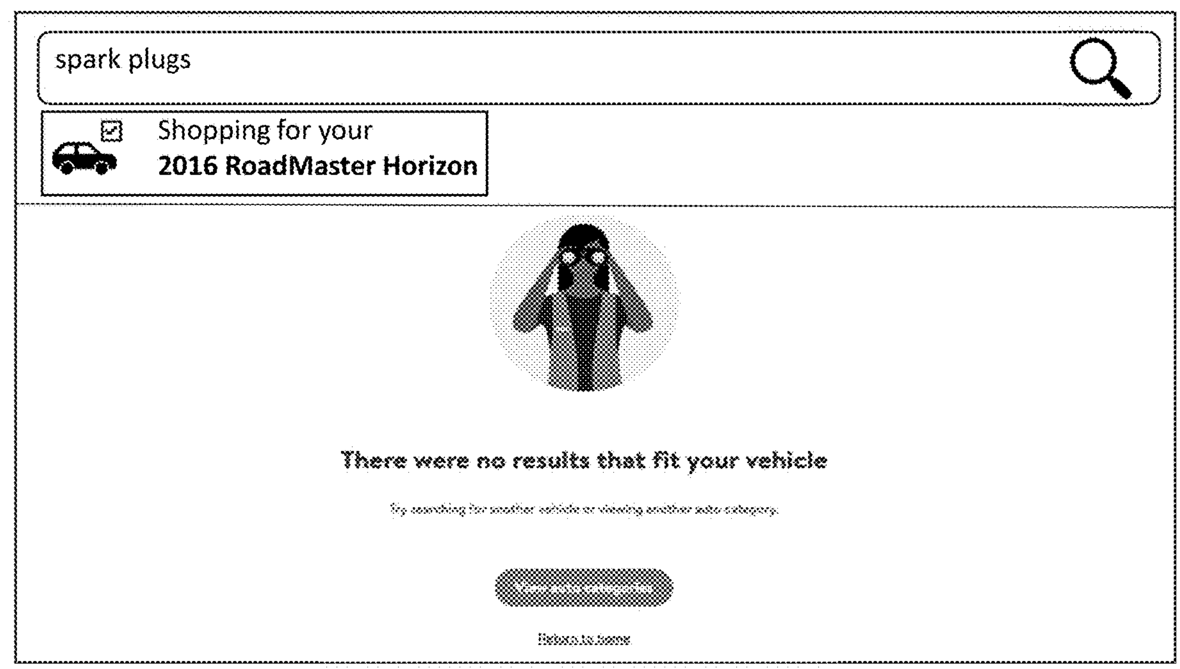
FIG. 4H
After
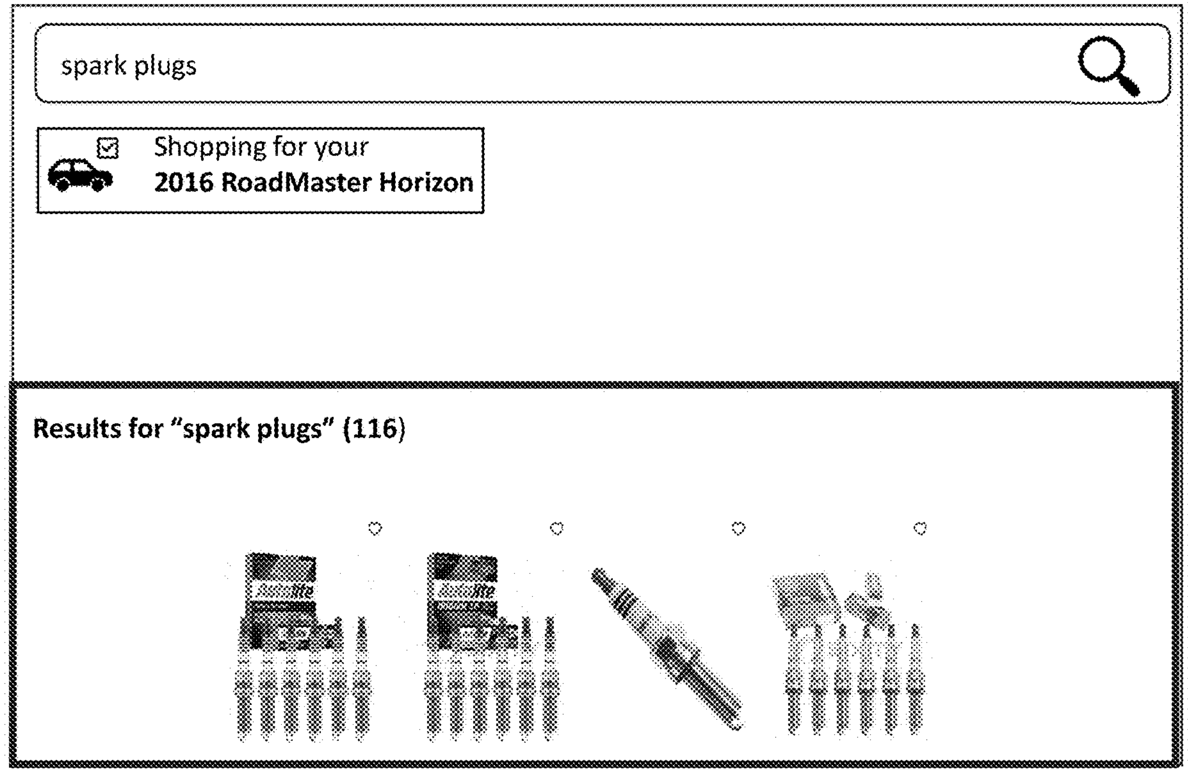

2114
Hard Drive
2116
CD-Rom Drive
Universal Serial Bus
2112
2220
Network Adapter
2208
Memory ROM/RAM
2204
Disk Controller
Graphics Adapter
2224
2214
System Bus
2226
2206
2202
Video Controller
CPU
Keyboard Adapter
Mouse Adapter
Other I/O Devices
2222
2106
Monitor
2210
2104
Keyboard
Mouse
2110

ENHANCED PTID PREDICTION AND ACCURATE FITMENT USING A PTID UNDERSTANDING MODEL

TECHNICAL FIELD

This disclosure relates generally to Part Terminology Identifier (PTID) prediction and fitment, and more particularly, to enhanced PTID prediction and accurate fitment using a PTID Understanding Model.

BACKGROUND

Part Terminology Identifier (PTID) is an ecommerce-standard term used to categorize/identify products associated with one or more predetermined domains (e.g., automotive parts), for example, the PTID for tires might be 7636 and associated with hundreds of thousands of related products, and the PTID for motor oil might be 12138 and associated with five thousand or so related products.

BRIEF DESCRIPTION OF THE DRAWINGS

To facilitate further description of the embodiments, the following drawings are provided in which:

FIGS. 4G and 4H illustrate respective examples of fitment before and after enhanced PTID prediction and accurate fitment using a PTID Understanding Model, according to an example embodiment;

DETAILED DESCRIPTION

Figure 1:
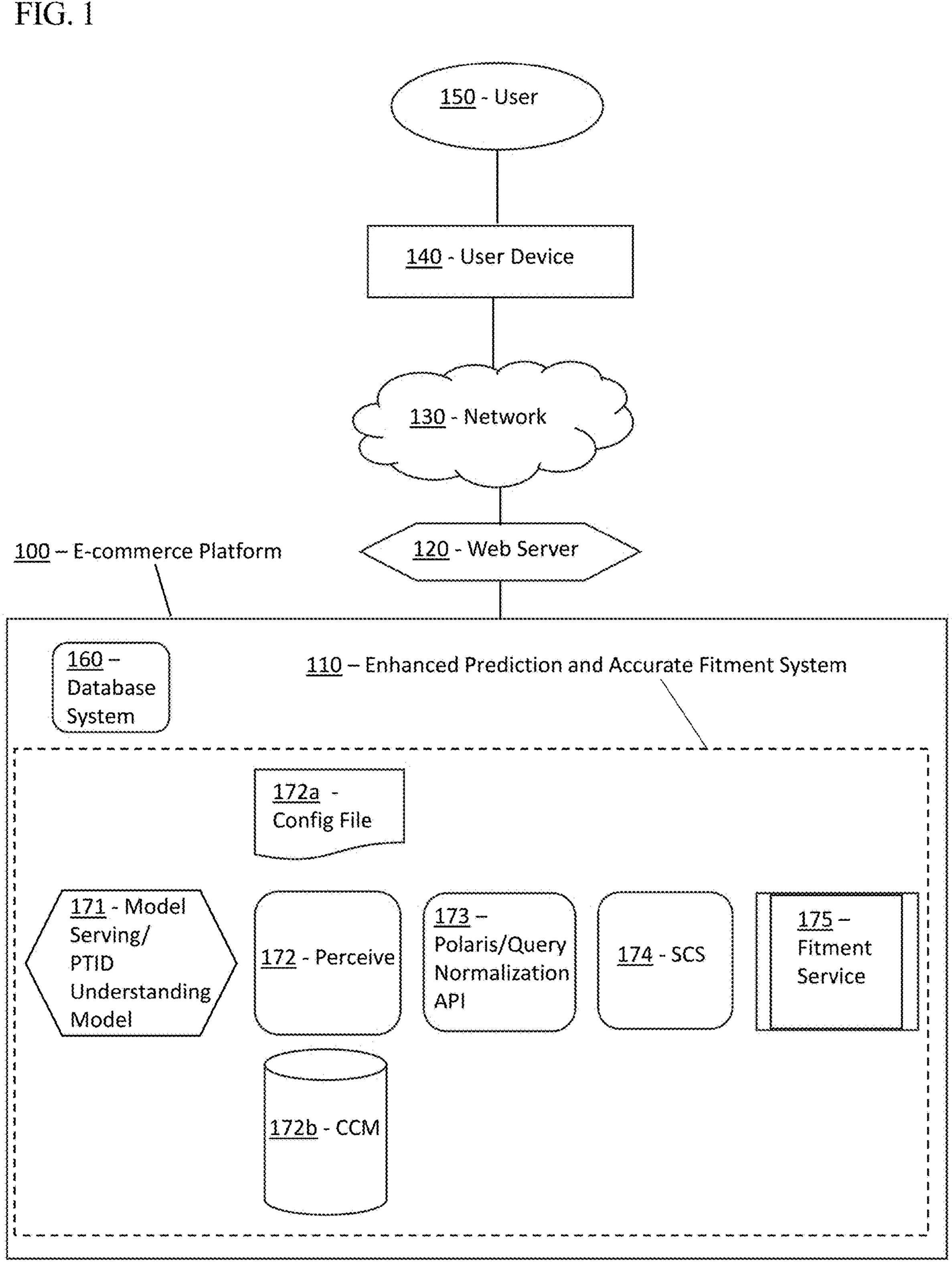
FIG. 1 illustrates a block diagram of an Enhanced Part Terminology Identifier (PTID) Prediction and Accurate Fitment System, according to an example embodiment.

A 'facet logic' method uses a frequency-based approach to predict the most relevant PTIDs for a query by counting the occurrences of each PTID in the retrieval results for a query and selecting the top five most frequent ones, but this facet logic method may lack the ability to understand the true context or intent behind a query and may lead to inaccurate predictions/results, especially with complex or technical queries. Another method, keyword-based search systems, match exact words or patterns but may fail when queries are ambiguous, technical, incomplete, or when synonyms are used. Rule-based systems and taxonomies, while useful in mapping queries to categories, require extensive manual setup and are less flexible. Some e-commerce platforms use general deep learning models for product recommendations, but these are often designed for broad recommendations and may struggle with domain-specific queries, such as those in the automotive parts sector.

Embodiments disclosed herein relate to a computer-implemented method for enhanced Part Terminology Identifier (PTID) prediction and accurate fitment using a PTID Understanding Model, a system therefor (e.g., an Enhanced PTID Prediction and Accurate Fitment System and architecture thereof), and a non-transitory computer-readable medium storing computing instructions therefor.

Embodiments disclosed herein can address, for example, the challenge of accurately interpreting user queries input by a user (e.g., customer) for products related to one or more predetermined domains (e.g., automotive parts) on e-commerce platforms (e.g., digital marketplace, digital storefront, mobile application, social media store, website, etc.), particularly in overcoming the limitations of the facet logic method. In the facet logic method, e-commerce systems for product categorization and search optimization would count the frequency of different PTIDs in the retrieval results for a query from search and indexing software (e.g., Solr) and select the top five most frequent PTIDs as the intended results. This frequency-based approach often fails to accurately capture intent of the query, especially when queries involve technical or ambiguous language, leading to suboptimal predictions/results. Predicted PTIDs can play a role downstream in triggering a process for 'fitment' (e.g., selection/determination of a fitment widget type and/or population of a fitment widget on a user interface of the e-commerce platform). The PTIDs in a recall set can determine which fitment widget will be shown to the user. When the fitment process is activated—meaning a valid PTID has been predicted from the query of the user—the user can be prompted to enter domain-specific information (e.g., vehicle information, such as make, year, and/or model, etc.) into a populated fitment widget. This domain-specific information, combined with predicted PTIDs, may then be passed to a parts identification and cataloging software program which constructs a refined query in the search and indexing software program (e.g., Solr). This final query filters the results (e.g., products, parts, items, etc.) displayed to the customer, for example, which can help provide parts that fit the customer's specific vehicle are shown.

Given this fitment process, the accuracy of PTID prediction(s) can be beneficial. Inaccurate PTID prediction(s) can lead to an incorrect or irrelevant fitment process, which directly impacts the results shown to the user. This can result in poor customer experience and missed sales opportunities, as customers might not be presented with the correct results (e.g., parts for their vehicle).

Embodiments of the PTID Understanding Model (e.g., comprising a Bidirectional Encoder Representations from Transformers (BERT) model) disclosed herein can address these issues by offering a more context-aware understanding of customer queries. Unlike the facet logic method, which simply counts PTID frequency, embodiments of the PTID Understanding Model can leverage deep learning to understand the semantic meaning of user queries, which can help provide more accurate and relevant PTIDs (e.g., determined/predicted PTIDs). This improvement is useful for triggering the correct fitment process, refining search results, and ultimately enhancing the customer's shopping experience by providing that the displayed products in results are highly relevant (e.g., fit a user's vehicle).

According to some example embodiments, a system is provided including a processor and a non-transitory computer-readable medium storing computing instructions that, when executed on the processor, cause the processor to perform operations. The operations include tokenizing a query into tokens. The tokens are transformed into embeddings. The embeddings are passed through a classification layer to produce log its. A sigmoid function is applied to convert the log its into a probability vector for a predetermined number of Part Terminology Identifiers (PTIDs). The probability vector is filtered to retain PTIDs associated with one or more predetermined domains (e.g., automotive parts). The PTIDs are based on respective probabilities that are at least equal to a predetermined probability threshold. A sum of the respective probabilities is equal to a predetermined sum value. The PTIDs are ranked based on their respective probabilities. Business logic is applied to the ranked PTIDs using a PTID Understanding Model to determine a final result that is output to a fitment service. The PTID Understanding Model is pretrained to trigger at least one of a fitment determination process or a query results filter process for the one or more predetermined domains when the final result is output as valid.

According to some example embodiments, a computer-implemented method is provided. The computer-implemented method can include tokenizing a query into tokens. The tokens are transformed into embeddings. The embeddings are passed through a classification layer of a Bidirectional Encoder Representations from Transformers (BERT) model to produce log its. A sigmoid function is applied to convert the log its into a probability vector for a predetermined number of Part Terminology Identifiers (PTIDs). The probability vector is filtered to retain PTIDs associated with one or more predetermined domains. The PTIDs are based on comprising respective probabilities that are at least equal to a predetermined probability threshold. A sum of the respective probabilities is equal to a predetermined sum value. The PTIDs are ranked based on their respective probabilities. Business logic is applied to the ranked PTIDs using a PTID Understanding Model to determine a final result that is output to a fitment service. The PTID Understanding Model is pretrained to trigger at least one of a fitment determination process or a query results filter process for the one or more predetermined domains when the final result is output as valid. The business logic can include: when a top ranked PTID is invalid and a respective probability is at least equal to a predetermined confidence level, the final result is output as invalid; when the top ranked PTID is valid and is at least equal to the predetermined confidence level, or when the top ranked PTID is invalid but the respective probability is less than the predetermined confidence level, a sum of all the respective probabilities for valid ranked PTIDs that are included in the probability vector, as filtered, is determined; and when the sum of all the respective probabilities of the valid ranked PTIDs is at least equal to a predetermined cutoff value, the valid ranked PTIDs are included in the final result, and the final result is output as valid.

According to some example embodiments, a non-transitory computer-readable medium is provided storing computing instructions that, when executed on a processor, cause the processor to perform operations. The operations include a computer-implemented method. The computer-implemented method can include tokenizing a query into tokens. The tokens are transformed into embeddings. The embeddings are passed through a classification layer to produce log its. A sigmoid function is applied to convert the log its into a probability vector for a predetermined number of Part Terminology Identifiers (PTIDs). The probability vector is filtered to retain PTIDs. The PTIDs are based on comprising respective probabilities that are at least equal to a predetermined probability threshold. A sum of the respective probabilities is equal to a predetermined sum value. The PTIDs are ranked based on their respective probabilities. Business logic is applied to the ranked PTIDs using a PTID Understanding Model to determine a final result that is output to a fitment service. The PTID Understanding Model is pretrained to trigger at least one of a fitment determination process or a query results filter process for the one or more predetermined domains when the final result is output as valid. The business logic can include: if a top ranked PTID is invalid and a respective probability is at least equal to a predetermined confidence level, the final result is output as invalid; if the top ranked PTID is valid and is at least equal to the predetermined confidence level, or if the top ranked PTID is invalid but the respective probability is less than the predetermined confidence level, a sum of all the respective probabilities for valid ranked PTIDs that are included in the probability vector, as filtered, is determined; and if the sum of all the respective probabilities of the valid ranked PTIDs is at least equal to a predetermined cutoff value, the valid ranked PTIDs are included in the final result, and the final result is output as valid.

FIG. 1 illustrates a block diagram of an Enhanced Part Terminology Identifiers (PTID) Prediction and Accurate Fitment System, according to an example embodiment.

Figure 2:
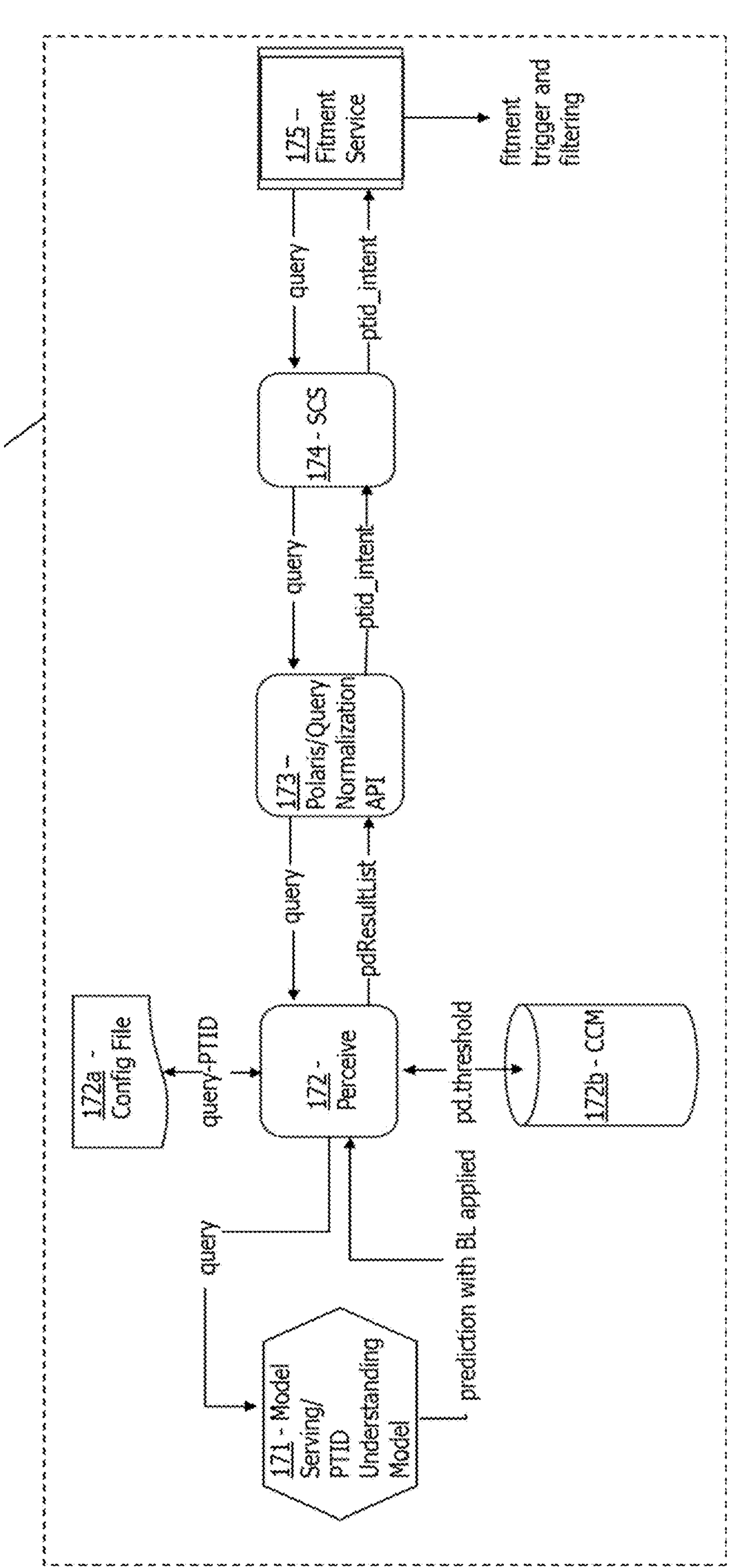
FIG. 2 illustrates a block diagram of an architecture of an Enhanced Part PTID Prediction and Accurate Fitment System, according to an example embodiment.

FIG. 2 illustrates a block diagram of an architecture of an Enhanced PTID Prediction and Accurate Fitment System, according to an example embodiment.

In an embodiment, an Enhanced Prediction and Accurate Fitment System 110 can be hosted on an E-commerce Platform 100. The Enhanced Prediction and Accurate Fitment System 110 can include various components that can work cooperatively to process queries and provide enhanced PTID predictions and accurate fitment results. The components of the Enhanced Prediction and Accurate Fitment System 110 may include the Model Serving/PTID Understanding Model 171, which can perform operations such as tokenizing the query into tokens, transforming the tokens into embeddings, passing the embeddings through a classification layer to produce log its, and applying a sigmoid function to convert the log its into a probability vector. The Model Serving/PTID Understanding Model 171 can process a query input by a User 150 via a User Device 140 and can generate initial PTID predictions/determinations. The User Device 140 can be connected to a Network 130 and the Network 130 can be further connected to a Web Server 120. The Web Server 120 can be further connected to the E-commerce Platform 100. A Database System 160 can be included or otherwise connected to the E-commerce Platform 100 and/or the Enhanced Prediction and Accurate Fitment System 110. The Database System 160 can store various inputs/outputs, parameters, criteria, thresholds, config files (e.g., Config File 172*a*), query-item and/or query-PTID tables, and performance metrics related to the E-commerce Platform 100 and/or the Enhanced Prediction and Accurate Fitment System 110.

A query can be input by the User 150 via the User Device 140 to the E-commerce platform 100 (e.g., search bar) and obtained by the Enhanced Prediction and Accurate Fitment System 110 (e.g., via the Fitment Service 175). The query can be passed through the intervening components in the following order: Service Component Specification (SCS) 174, Query Normalization API 173, Perceive Component 172, and ultimately to the Model Serving/PTID Understanding Model 171. This right-to-left flow can help provide that the query is appropriately processed and/or normalized at one or more steps before reaching the Model Serving/PTID Understanding Model 171 for initial processing.

The Model Serving/PTID Understanding Model 171 can perform operations including tokenizing the query, transforming the tokens into embeddings, passing the embeddings through a classification layer to produce log its (e.g., via an included Bidirectional Encoder Representations from Transformers (BERT) model), and applying a sigmoid function to convert the log its into a probability vector. The Perceive Component 172 can communicate with a Configuration and Control Module (CCM) **172*b* to obtain a probability threshold (e.g., pd.threshold) and with a Config File 172*a* to obtain the query-PTID. The Query Normalization API 173 can normalize and/or preprocess the query-PTID. The SCS 174** can filter the probability vector to retain PTIDs associated with one or more predetermined domains based on respective probabilities that are at least equal to a predetermined probability threshold. A sum of the respective probabilities can be equal to a predetermined sum value. The Query Normalization API can rank the PTIDs, as retained, included in the probability vector, as filtered, based on their respective probabilities.

The Perceive Component 172 can apply predetermined business logic to the ranked PTIDs to determine the final result. This can include validating or invalidating one or more top-ranked PTID based on probability and confidence level. The Perceive Component 172 can output the "pdResultList" to the Query Normalization API 173. For example:

```
- pdResultList: [
- {
  source: "modelPredicton",
  ptid: "7636"
  ptidName: "Tires"
  probability: 0.9957905411720276
  }
],
```

The Query Normalization API 173 can process and normalize the results from the pdResultList, outputting the "ptid_intent" to the SCS 174. For example:

```
- omni_intent: {
  name: "ACC"
  fitment intent: "tires",
  - ptid_intent: [
    "7636"
  ]
},
```

The SCS 174 can further process the "ptid_intent" and output it to the Fitment Service 175. The Fitment Service 175 can use the "ptid_intent" to determine the accurate fitment for the query and provide the final fitment results to the user.

The Perceive Component 172 can access with the Config File **172*a* and the CCM 172*b* (e.g., bidirectionally). The Perceive Component 172 can obtain the probability threshold (pd.threshold) from the CCM 172*b* and the query-PTID from the Config File 172*a*. The Perceive Component 172 can also apply the predetermined business logic to the ranked PTIDs to determine the final result. The Query Normalization API 173 can intervene to normalize and preprocess the query-PTID and other relevant parameters. The Query Normalization API 173** can provide the query is in a standardized format, resolving any ambiguities and enhancing query accuracy before passing it to the next component.

The Service Component Specification (SCS) 174 can include filtering the probability vector to retain PTIDs associated with one or more predetermined domains based on the obtained probability threshold. It may also rank the PTIDs based on their respective probabilities, facilitating the identification of the most likely PTIDs for the given query.

The Fitment Service 175 can receive the final processed results from the SCS 174. The Fitment Service 175 can use the "ptid_intent" to determine accurate fitment for the query and provide the final fitment results (e.g., fitment determination/selection, fitment widget type selection/determination, and/or fitment widget population, etc.) to the User 150. The fitment determination process can involve several steps. The Fitment Service 175 can determine a fitment widget to display (e.g., Domain Specific Widget, Tire Finder Widget, Part Finder Widget, etc.) to the User 150 by verifying that the query relates to one or more predetermined domains (e.g., automotive parts). The SCS 174 can retrieve a list of recalled PTIDs corresponding to the valid ranked PTIDs and respective product counts from a presentation service. The Fitment Service 175 can use a parts identification and cataloging software which can construct a refined query in a search and indexing software (e.g., Solr) application to identify which of the valid ranked PTIDs are fitment-enabled. The Fitment Service 175 can select fitment-enabled valid ranked PTIDs with the highest numbers of associated products and use the parts identification and cataloging software to obtain a fitment form for the selected fitment-enabled valid ranked PTIDs. The Fitment Service 175 can populate the determined/selected fitment widget on a display interface (e.g., via the User Device 140) of the E-commerce Platform 100 based on the obtained fitment form, prompting the User 150 to input product-specific information.

The query results filter process can involve refining query results by adding a fitment filter parameter to a uniform resource locator. This task can be performed by the Query Normalization API 173. The SCS 174 can pass the uniform resource locator to a search engine of the E-commerce Platform 100. The Query Normalization API 173 can incorporate the fitment filter parameter as an additional query parameter. The fitment filter parameter can be based on the input product-specific information provided/obtained from the User 150 by the Fitment Service 175.

The E-commerce Platform 100 and the Enhanced Prediction and Accurate Fitment System 110 are example embodiments, and embodiments thereof are not limited to just the explicit embodiments illustrated and described herein. The E-commerce Platform 100 and the Enhanced Prediction and Accurate Fitment System 110 can be employed in many different embodiments or examples not explicitly depicted or described herein. In some embodiments, certain elements, modules, or systems of E-commerce Platform 100 and/or the Enhanced Prediction and Accurate Fitment System 110 can perform various procedures, processes, and/or activities. In other embodiments, the procedures, processes, and/or activities can be performed by other suitable elements, modules, or systems of the E-commerce Platform 100 and/or the Enhanced Prediction and Accurate Fitment System 110.

The E-commerce Platform 100 and/or the Enhanced Prediction and Accurate Fitment System 110, the Database System 160, and/or the Web Server 120 can each be a computer system, such as computer system 2100 (FIG. 5), as described below, and can each be a single computer, a single server, or a cluster or collection of computers or servers, or a cloud of computers or servers. In another embodiment, a single computer system can host the E-commerce Platform 100 and/or the Enhanced Prediction and Accurate Fitment System 110, the Database System 160, and/or the Web Server 120.

In some embodiments, the Web Server 120 can be in data communication through a Network 130 with one or more user devices, such as the User Device 140. The User Device 140 can be part of the E-commerce Platform 100 and/or the Enhanced Prediction and Accurate Fitment System 110 or external to the E-commerce Platform 100 and/or the Enhanced Prediction and Accurate Fitment System 110. The Network 130 can be the Internet or another suitable network. In some embodiments, the User Device 140 can be used by the User 150. In many embodiments, the Web Server 120 can host one or more websites and/or mobile application servers. For example, the Web Server 120 can be a web server that hosts a website, or provides a server that interfaces with an application (e.g., a mobile application), for the User Device 140, which can allow the user to avail themselves of the computer-implemented method for enhanced PTID prediction and accurate fitment using the PTID Understanding Model.

In some embodiments, an internal network that is not open to the public can be used for communications between the Enhanced Prediction and Accurate Fitment System 110 and the Web Server 120 within the E-commerce Platform 100. Accordingly, in some embodiments, the Enhanced Prediction and Accurate Fitment System 110 (and/or the software used by such systems) can refer to a back end of E-commerce Platform 100 operated by an operator and/or administrator of the E-commerce Platform 100, and the Web Server 120 (and/or the software used by such systems) can refer to a front end of E-commerce Platform 100, as is can be accessed and/or used by one or more users, such as the User 150, using the User Device 140. In these or other embodiments, the operator and/or administrator of the E-commerce Platform 100 can manage the E-commerce Platform 100, the processor(s) of the E-commerce Platform 100, and/or the memory storage unit(s) of E-commerce Platform 100 using the input device(s) and/or display device(s) of the E-commerce Platform 100.

In certain embodiments, the user devices (e.g., User Device 140) can be desktop computers, laptop computers, mobile devices, and/or other endpoint devices used by one or more users (e.g., User 150). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand.

Examples of mobile devices can include (i) an iPod®, iPhone®, iTouch®, iPad®, MacBook® or similar product by Apple Inc. of Cupertino, California, United States of America, and/or (ii) a Galaxy™ or similar product by the Samsung Group of Samsung Town, Seoul, South Korea. Further, in the same or different embodiments, a mobile device can include an electronic device configured to implement the iPhone® operating system by Apple Inc. of Cupertino, California, United States of America, the Android™ operating system developed by the Open Handset Alliance, or another suitable operating system.

In many embodiments, the E-commerce Platform 100, the Enhanced Prediction and Accurate Fitment System 110, the Database System 160, and/or the Web Server 120 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). The input device(s) and the display device(s) can be coupled thereto in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of the E-commerce Platform 100, the Enhanced Prediction and Accurate Fitment System 110, and/or the Web Server 120. In a similar manner, the processors and/or the non-transitory computer-readable media can be local and/or remote to each other.

Figure 5:
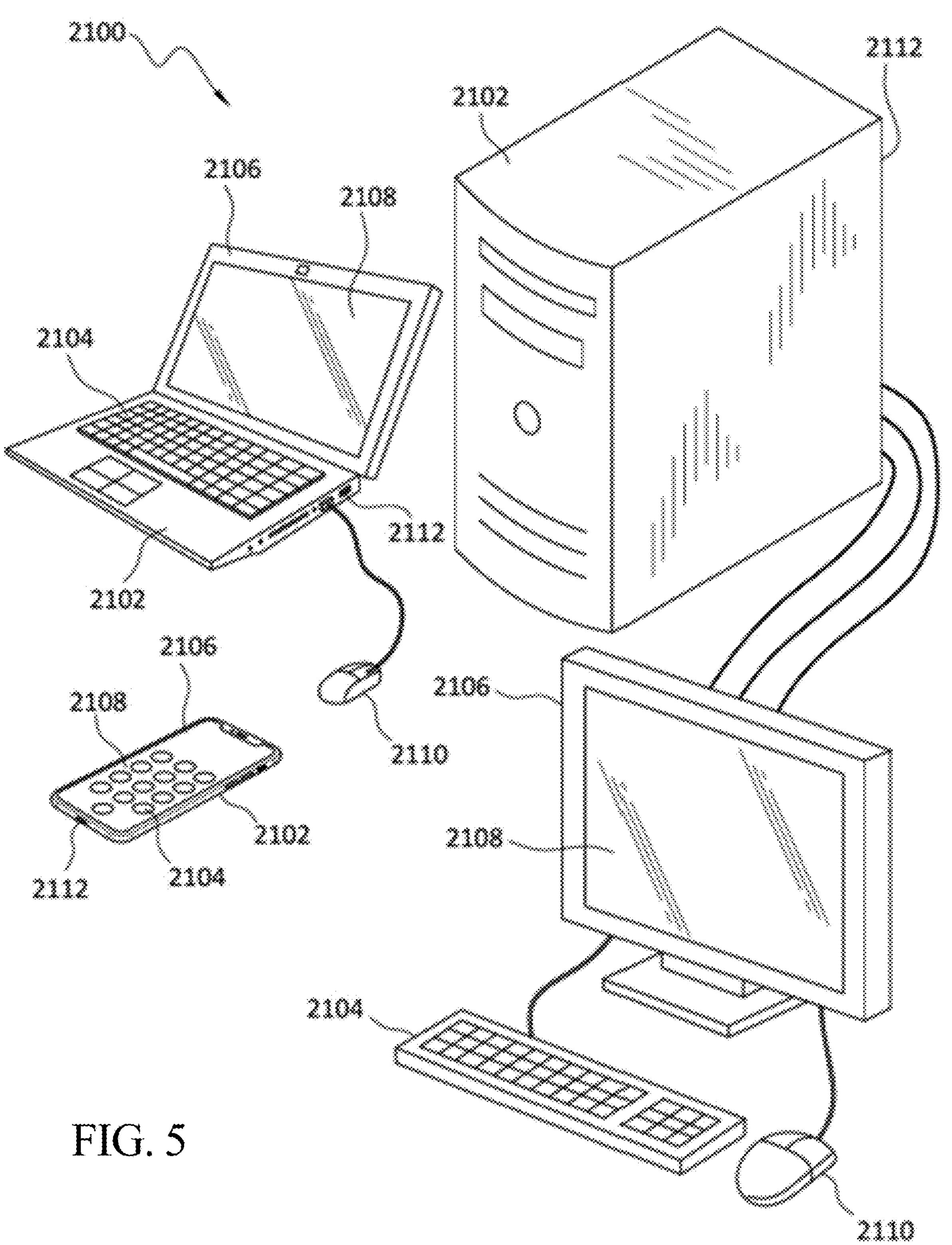
FIG. 5 illustrates a front elevational view of a computer system that is suitable for implementing an Enhanced PTID Prediction and Accurate Fitment System, according to an example embodiment.

In many embodiments, the E-commerce Platform 100, the Enhanced Prediction and Accurate Fitment System 110, and/or the Web Server 120 also can be configured to communicate with one or more databases, such as the Database System 160. The one or more databases can be stored on one or more memory storage units (e.g., non-transitory computer readable media), which can be similar or identical to the one or more memory storage units (e.g., non-transitory computer readable media) described with respect to computer system 2100 (FIG. 5). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Examples of database management systems can include MySQL (Structured Query Language) Database, PostgreSQL Database, Microsoft SQL Server Database, Oracle Database, SAP (Systems, Applications, & Products) Database, and IBM DB2 Database.

The E-commerce Platform 100, the Enhanced Prediction and Accurate Fitment System 110, the Web Server 120, and/or the Database System 160 can be implemented using any suitable manner of wired and/or wireless communication. Accordingly, the E-commerce Platform 100 and/or the Enhanced Prediction and Accurate Fitment System 110 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Examples of PAN protocol(s) can include Bluetooth, Zigbee, Wireless Universal Serial Bus (USB), Z-Wave, etc.; examples of LAN and/or WAN protocol(s) can include Institute of Electrical and Electronic Engineers (IEEE) 802.3 (also known as Ethernet), IEEE 802.11 (also known as WiFi), etc.; and examples of wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The predetermined communication software and/or hardware implemented can depend on the network topologies and/or protocols implemented, and vice versa. In many embodiments, examples of communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further examples of communication hardware can include wireless communication hardware including, for example, one or more radio transceivers, one or more infrared transceivers, etc. Additional examples of communication hardware can include one or more networking components (e.g., modulator-demodulator components, gateway components, etc.).

Figure 3:
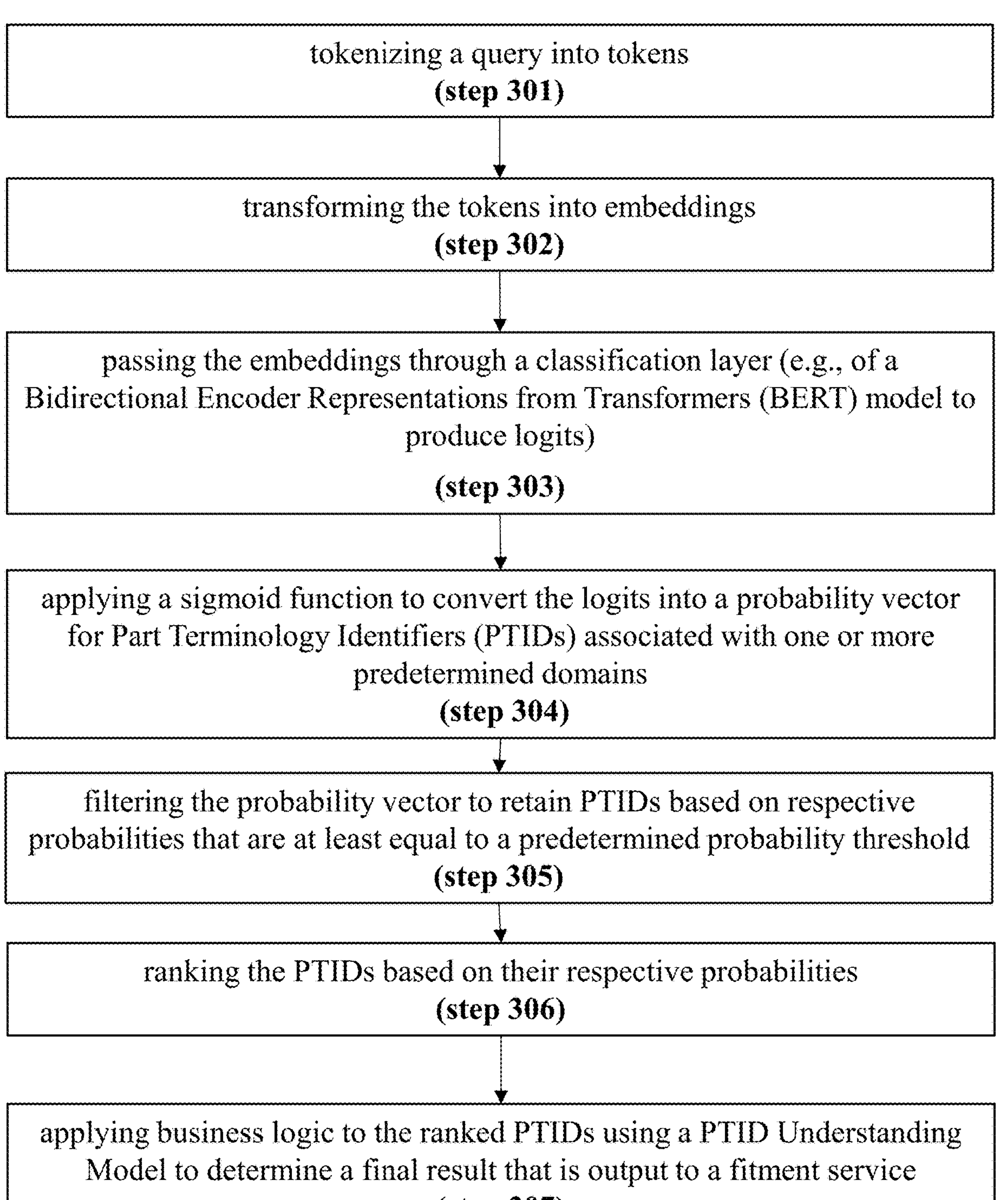
FIG. 3 illustrates a flowchart of a computer-implemented method for enhanced PTID prediction and accurate fitment using a PTID Understanding Model, according to an example embodiment.

FIG. 3 illustrates a flowchart of a computer-implemented method for enhanced Part Terminology Identifier (PTID) prediction and accurate fitment using a PTID Understanding Model, according to an example embodiment.

According to some example embodiments, a computer-implemented method 300 can be provided for enhanced PTID prediction and accurate fitment using a PTID Understanding Model.

In some embodiments, a system can be provided including a processor and a non-transitory computer-readable medium storing computing instructions that, when executed on the processor, cause the processor to perform operations that can include the computer-implemented method 300 for enhanced Part Terminology Identifier (PTID) prediction and accurate fitment using a PTID Understanding Model.

In some embodiments, the computer-implemented method 300 for enhanced PTID prediction and accurate fitment using a PTID Understanding Model can be performed by the Enhanced Prediction and Accurate Fitment System illustrated and described with reference to FIG. 1, such as the Enhanced Prediction and Accurate Fitment System 110.

In some embodiments, the Enhanced Prediction and Accurate Fitment System can be implemented with the architecture of the Enhanced Prediction and Accurate Fitment System 110 illustrated and described with reference to FIG. 2.

In some embodiments, a non-transitory computer-readable medium can be provided storing computing instructions that, when executed on a processor, cause the processor to perform operations that can include the computer-implemented method 300 for enhanced PTID prediction and accurate fitment using a PTID Understanding Model.

According to an embodiment, the computer-implemented method 300 can include tokenizing a query input by a user (e.g., customer) into tokens (step 301). The tokenizing the query into the tokens can be performed by a Natural Language Processing (NLP) model (e.g., a Bidirectional Encoder Representations from Transformers (BERT) model). The NLU model can process the query and can segment the query into individual tokens, which can represent the basic units of text used for further processing.

The tokens can be transformed into embeddings (step 302). The transforming the tokens into the embeddings can be performed by the NLU model. This transformation can convert each token into a high-dimensional vector representation, which can capture the semantic meaning of the tokens in the context of the query.

The embeddings can be passed through a classification layer of the NLU model to produce log its (step 303). The passing the embeddings through the classification layer to produce log its can be performed by the NLU model. The classification layer can apply learned weights to the embeddings and can generate a set of log its, which can represent raw, unnormalized scores which can represent the likelihood of each token belonging to a particular class (e.g., PTID).

A sigmoid function can be applied to convert the log its into a probability vector for PTIDs (e.g., a predetermined number of PTIDs) (step 304). The applying the sigmoid function to convert the log its into the probability vector can be performed by applying a mathematical function to the log its (e.g., by a PTID Understanding Model and/or an Enhanced Prediction and Accurate Fitment System). The sigmoid function can map the log its to a range (e.g., between 0 and 1), and can produce a probability for each token that indicates the likelihood of it being associated with a PTID of the predetermined number of PTIDs.

The probability vector can be filtered, such as to retain PTIDs (e.g., among the predetermined numbers of PTIDs) associated with one or more predetermined domains (step 305). The PTIDs can be based on comprising respective probabilities that are at least equal to a predetermined probability threshold (e.g., 1% or greater). A sum of the respective probabilities can be equal to a predetermined sum value. The filtering the probability vector to retain only the PTIDs can be performed by the Enhanced Prediction and Accurate Fitment System (e.g., a Probability Filtering Mechanism). The Perceive Component can access with a CCM (Configuration and Control Module) to obtain the probability threshold (pd.threshold) and with a Config File to obtain the query-PTID. A Query Normalization API can normalize and preprocess the query-PTID and other relevant parameters. Using this information, the Enhanced Prediction and Accurate Fitment System (e.g., the Probability Filtering Mechanism) can select PTIDs whose respective probabilities meet or exceed the obtained probability threshold, with the sum of the selected probabilities constrained to equal a predetermined sum value.

At least a subset of the PTIDs can be ranked based on their respective probabilities (step 306). The ranking the PTIDs based on their respective probabilities can be performed by the Enhanced Prediction and Accurate Fitment System (e.g., the SCS). The SCS can order the PTIDs from highest to lowest probability, facilitating the identification of the most likely PTIDs for the given query.

Business logic can be applied to the ranked PTIDs using a PTID Understanding Model to determine a final result that can be output to a Fitment Service (step 307). The PTID Understanding Model can be pretrained to trigger at least one of a fitment determination process or a query results filter process for one or more predetermined domains when the final result is output as valid. The business logic can include: when one or more top ranked PTID is invalid and a respective probability is at least equal to a predetermined confidence level, the final result is output as invalid; when the one or more top ranked PTID is valid and is at least equal to the predetermined confidence level, or when the one or more top ranked PTID is invalid but the respective probability is less than the predetermined confidence level, a sum of all the respective probabilities for valid ranked PTIDs that are included in the probability vector, as filtered, is determined; and when the sum of all the respective probabilities of the valid ranked PTIDs is at least equal to a predetermined cutoff value, the valid ranked PTIDs are included in the final result, and the final result is output as valid. The applying business logic to the ranked PTIDs can be performed by the Enhanced Prediction and Accurate Fitment System (e.g., the Perceive Component). The Perceive Component can use the ranked PTIDs and apply predetermined business logic to determine the final result. This can include conditions for validating or invalidating the top-ranked PTID based on its probability and confidence level. If the top-ranked PTID is invalid but its probability is below the confidence level, the sum of probabilities for valid PTIDs is calculated. If this sum meets or exceeds a predetermined cutoff value, the valid PTIDs are included in the final result (e.g., as predicted PTIDs), which is then output as valid. If a predetermined confidence level is not achieved for a prospective PTID prediction with respect to the final result, the facet logic method can be employed of using item counts from the recalled PTIDs.

After the PTID Understanding Model is triggered and generates the predicted PTIDs, the final result can be sent to the Fitment Service. The Fitment Service can determine whether to activate a fitment widget and/or select/determine a fitment widget type based on the PTID Understanding Model's output (e.g., the final result), which can directly influence the results (e.g., products) displayed to users on an E-commerce Platform interface via their User Device.

According to an embodiment, operations including the computer-implemented method 300 can be performed. The operations can include tokenizing a query into tokens. The tokens can be transformed into embeddings. The embeddings can be passed through a classification layer to produce log its. A sigmoid function can be applied to convert the log its into a probability vector for a predetermined number of Part Terminology Identifiers (PTIDs). The probability vector can be filtered to retain only PTIDs. The PTIDs can be based on comprising respective probabilities that are at least equal to a predetermined probability threshold. A sum of the respective probabilities can be equal to a predetermined sum value. The PTIDs can be ranked based on their respective probabilities. Business logic can be applied to the ranked PTIDs using a PTID Understanding Model to determine a final result that can be output to a Fitment Service. The PTID Understanding Model can be pretrained to trigger at least one of a fitment determination process or a query results filter process for the one or more predetermined domains when the final result is output as valid.

According to an embodiment, operations including the computer-implemented method 300 can be performed. The operations can include tokenizing a query into tokens. The tokens can be transformed into embeddings. The embeddings can be passed through a classification layer to produce log its. A sigmoid function can be applied to convert the log its into a probability vector for a predetermined number of Part Terminology Identifiers (PTIDs). The probability vector can be filtered to retain only PTIDs. The PTIDs can be based on comprising respective probabilities that are at least equal to a predetermined probability threshold. A sum of the respective probabilities can be equal to a predetermined sum value. The PTIDs can be ranked based on their respective probabilities. Business logic can be applied to the ranked PTIDs using a PTID Understanding Model to determine a final result that can be output to a Fitment Service. The PTID Understanding Model can be pretrained to trigger at least one of a fitment determination process or a query results filter process for the one or more predetermined domains when the final result is output as valid. The business logic can include: if a top ranked PTID is invalid and a respective probability is at least equal to a predetermined confidence level, the final result is output as invalid; if the top ranked PTID is valid and is at least equal to the predetermined confidence level, or if the top ranked PTID is invalid but the respective probability is less than the predetermined confidence level, a sum of all the respective probabilities for valid ranked PTIDs that are included in the probability vector, as filtered, is determined; and if the sum of all the respective probabilities of the valid ranked PTIDs is at least equal to a predetermined cutoff value, the valid ranked PTIDs are included in the final result, and the final result is output as valid.

In an embodiment, the predetermined probability threshold can be approximately 1%, which can help effectively filter out low-confidence PTIDs while retaining those with meaningful relevance, a value that can be derived from empirical analysis of query-PTID relationships within domain-specific (e.g., automotive parts) datasets. The predetermined confidence level can be approximately 50%, which can help strike a balance between precision and recall for identifying valid PTIDs, a threshold that can be determined through data analysis in which the PTID Understanding Model can help achieve improved performance in distinguishing relevant PTIDs from irrelevant PTIDs. The predetermined cutoff value can be approximately 50%, which can help ensure that the collective sum of probabilities for valid PTIDs reflects a strong likelihood of accurate fitment, a figure that can be validated through iterative testing against key business metrics, including fitment widget accuracy and/or null page view rates.

In an embodiment, the fitment determination process can include determining a fitment widget to display to a user by verifying that the query relates to one or more predetermined domains, retrieving a list of recalled PTIDs corresponding to the valid ranked PTIDs and respective product counts from a presentation service, using a part finder application to identify which of the valid ranked PTIDs are fitment-enabled, selecting fitment-enabled valid ranked PTIDs with the highest numbers of associated products, and using the part finder application to obtain a fitment form for the selected fitment-enabled valid ranked PTIDs. The determined fitment widget can then be populated on a display interface of an e-commerce platform based on the obtained fitment form, prompting the user to input product-specific information.

In an embodiment, the query results filter process can include refining query results by adding a fitment filter parameter to a uniform resource locator, passing the uniform resource locator to a search engine, and incorporating the fitment filter parameter as an additional query parameter. The fitment filter parameter can be based on the input product-specific information.

In an embodiment, the PTID Understanding Model can include the BERT model, and the PTID Understanding Model can include a single-label (e.g., x—y pattern: query1—PTID1, query1—PTID2, query2—PTID20, etc.) multi-class classification BERT model or a multi-label (e.g., x—y pattern: query1—[PTID1,PTID2], query2—[PTID20], etc.) multi-class classification model. Embodiments of the single-label multi-class classification model can have various weightings (e.g., no weighting, "yes, log (Add-To-Cart (ATC) of PTID)" or "yes, norm(ATC), etc.). However, the present inventive concept is not limited thereto. Embodiments of the multi-label multi-class classification model can include no weighting or a "yes, log (ATC of query)" weighting.

In an embodiment, the computer-implemented method 300 can further include constructing a training dataset for training the PTID Understanding Model to trigger at least one of the fitment determination process or the query results filter process for the one or more predetermined domains when the final result is output as valid. Constructing the training dataset can include aggregating user engagement data from search logs, primarily selecting records in which products were added to a cart, indicating positive engagement. A query-PTID table can be obtained (e.g., of query-PTID relationships), for example:

query-item

| query | item_id | ptid | ptid_nm | atc |
|---|---|---|---|---|
| towing accessories | 164232024 | 18353 | Truck Tool Box | 12 |
| towing accessories | 48353621 | 18353 | Truck Tool Box | 1 |
| towing accessories | 15125826 | 14537 | Trader Hitch Lock | 4 |
| towing accessories | 207916766 | −1 | No Name | 1 |
| . . . | . . . | . . . | . . . | . . . |
| 275 60 r 20 | 347911448 | 7636 | Tires | 24 |
| 275 60 r 20 | 406951511 | 7636 | Tires | 12 |
| . . . | . . . | . . . | . . . | . . . |
| car seat covers waterproof | 2421731108 | −1 | No Name | 11 |
| car seat covers waterproof | 462926950 | −1 | No Name | 2 |
| . . . | . . . | . . . | . . . | . . . |

The user engagement data from the search logs can be filtered to retain training queries and respective training data associated with the one or more predetermined domains. The filtered user engagement data can be standardized by assigning a predetermined placeholder value to included products without valid PTIDs. The standardized and filtered user engagement data can then be converted into "query-PTID" relationships suitable for training the PTID Understanding Model, which can be a weighted single-label multi-class model. The training dataset can include millions of "query-item" pairs with a significant portion being linked to valid PTIDs. Items without valid PTIDs can be assigned a placeholder value ('−1') to standardize the data. For example, a query-PTID table can be obtained, such as by filtering the query-item table by a predetermined filter threshold (e.g., cumulative number of ATC of each PTID under one query >=30) and omitting an item_id column:

query-PTID

| query | ptid | ptid_nm | atc |
|---|---|---|---|
| towing accessories | 18353 | Truck Tool Box | 13 |
| towing accessories | −1 | No Name | 265 |
| . . . | . . . | . . . | . . . |
| 275 60 r 20 | 7636 | Tire | 162 |
| car seat covers waterproof | −1 | No Name | 369 |
| . . . | . . . | . . . | . . . |

In an embodiment, the computer-implemented method 300 can further include preprocessing the training queries by tokenizing and converting the training queries into training embeddings using the BERT model included in the PTID Understanding Model. A fully connected layer can be added to the BERT model to convert the training embeddings into training predictions for predetermined training PTIDs. Predicted training probability distributions for the predetermined training PTIDs can be output to rank the predetermined training PTIDs according to respective predicted probabilities for each of the training queries.

In an embodiment, the computer-implemented method 300 can further include utilizing GPU acceleration for training the PTID Understanding Model to trigger at least one of the fitment determination process or the query results filter process for the one or more predetermined domains when the final result is output as valid. The method can also include optimizing hyperparameters of the PTID Understanding Model, including one or more learning rate, batch size, and weight decay, or using a cross-entropy loss function to improve the accuracy of PTIDs predicted by the PTID Understanding Model by comparing the predicted training probability distributions with true PTID labels.

In an embodiment, the computer-implemented method 300 can further include selecting a subset of the training queries from the constructed training dataset to create a test sample, using the remainder of the training queries from the training dataset for training the PTID Understanding Model to trigger at least one of the fitment determination process or the query results filter process for the one or more predetermined domains when the final result is output as valid, and testing the PTID Understanding Model that is pretrained on the test sample to evaluate the accuracy of the PTIDs predicted by the PTID Understanding Model.

Figure 4A:
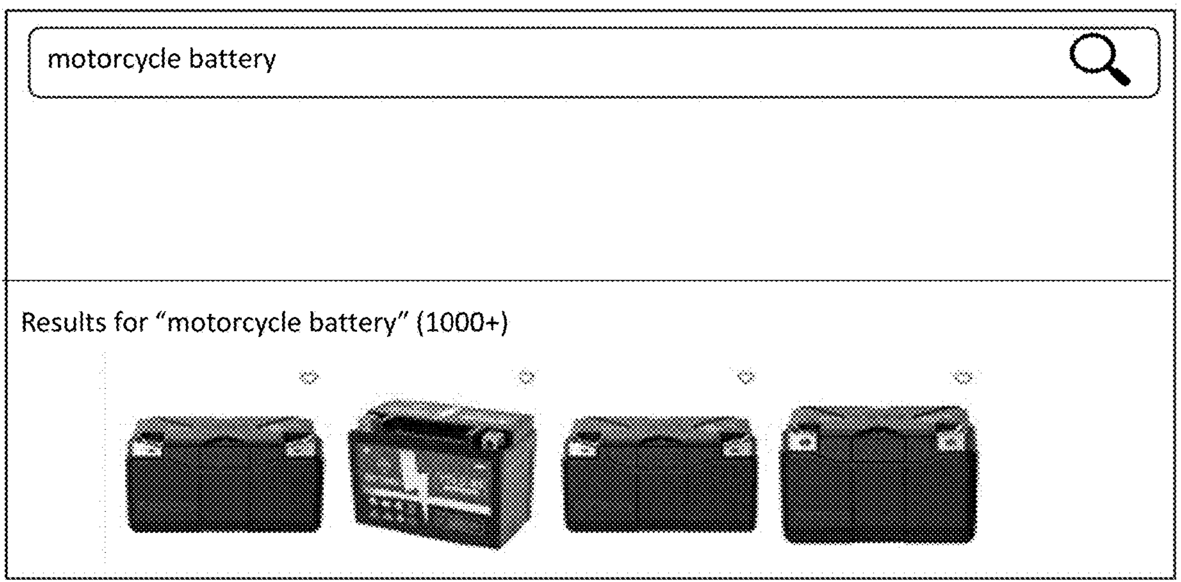
FIGS. 4A and 4B illustrate respective examples of fitment before and after enhanced PTID prediction and accurate fitment using a PTID Understanding Model, according to an example embodiment.
Figure 4B:
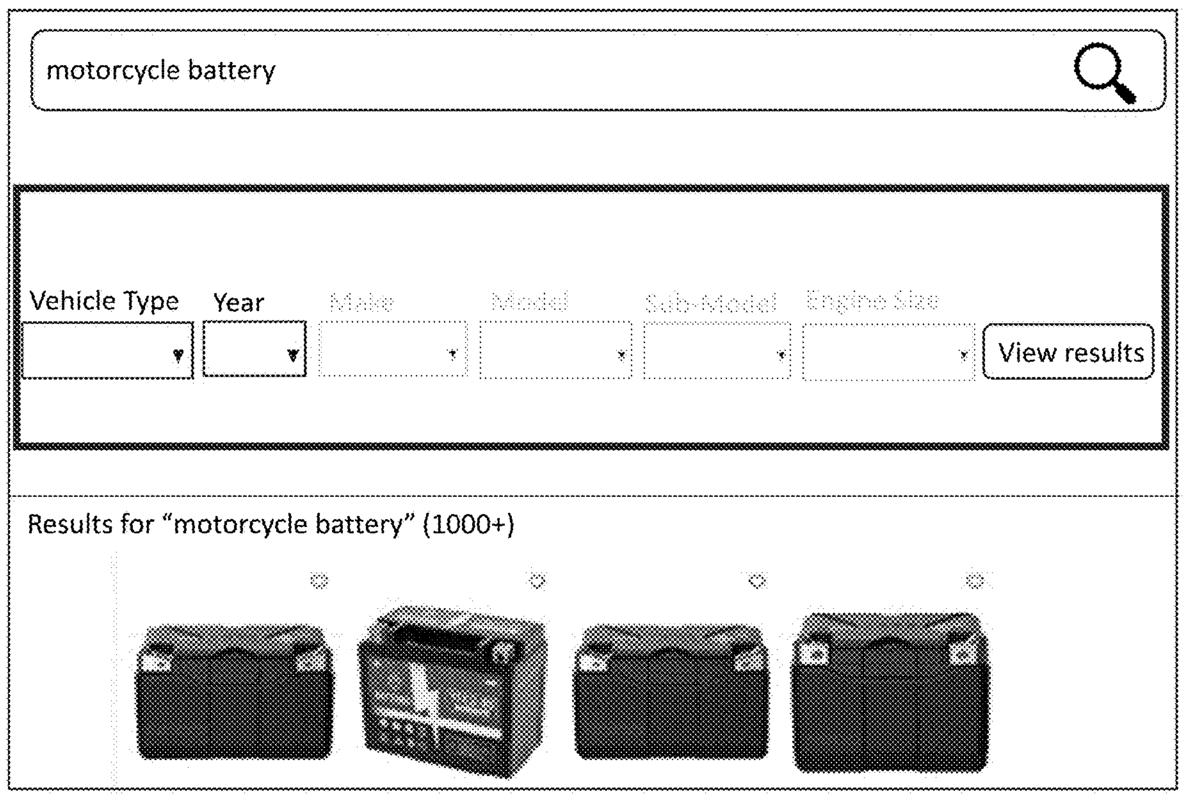

FIGS. 4A and 4B illustrate respective examples of fitment before and after enhanced Part Terminology Identifier (PTID) prediction and accurate fitment using a PTID Understanding Model, according to an example embodiment. In FIG. 4A, a user inputs a query for "motorcycle battery" relying on facet logic/rule(s). Facet logic fails to trigger the fitment widget for a query like "motorcycle battery" because it relies on the frequency of PTIDs in search results for the query rather than understanding the specific context of the query. For example, when a user searches for "motorcycle battery," the system might return a variety of battery-related items, such as "battery charger," "car battery," and "battery terminals," based on their frequency in the search results. These irrelevant terms can be prioritized over the specific "motorcycle battery" term if they appear more frequently. This happens because facet logic does not understand the specific context or intent behind the query and simply counts how often each PTID appears. Additionally, if there is not a dedicated PTID for "motorcycle battery," the system might struggle to accurately identify and prioritize it. While "motorcycle" might be a PTID, it is not joined with "battery" in a way that accurately reflects the user's intent. As a result, the fitment widget, which prompts the user to enter their motorcycle details, is not triggered (FIG. 4A). In contrast, the PTID Understanding Model which can be a BERT-based model uses deep learning to understand the context and meaning of the query, accurately identifying "motorcycle battery" as the relevant PTID. This approach provides that the fitment widget is triggered (FIG. 4B), prompting the user to enter their motorcycle details and improving the accuracy and relevance of the search results.

Figure 4C:
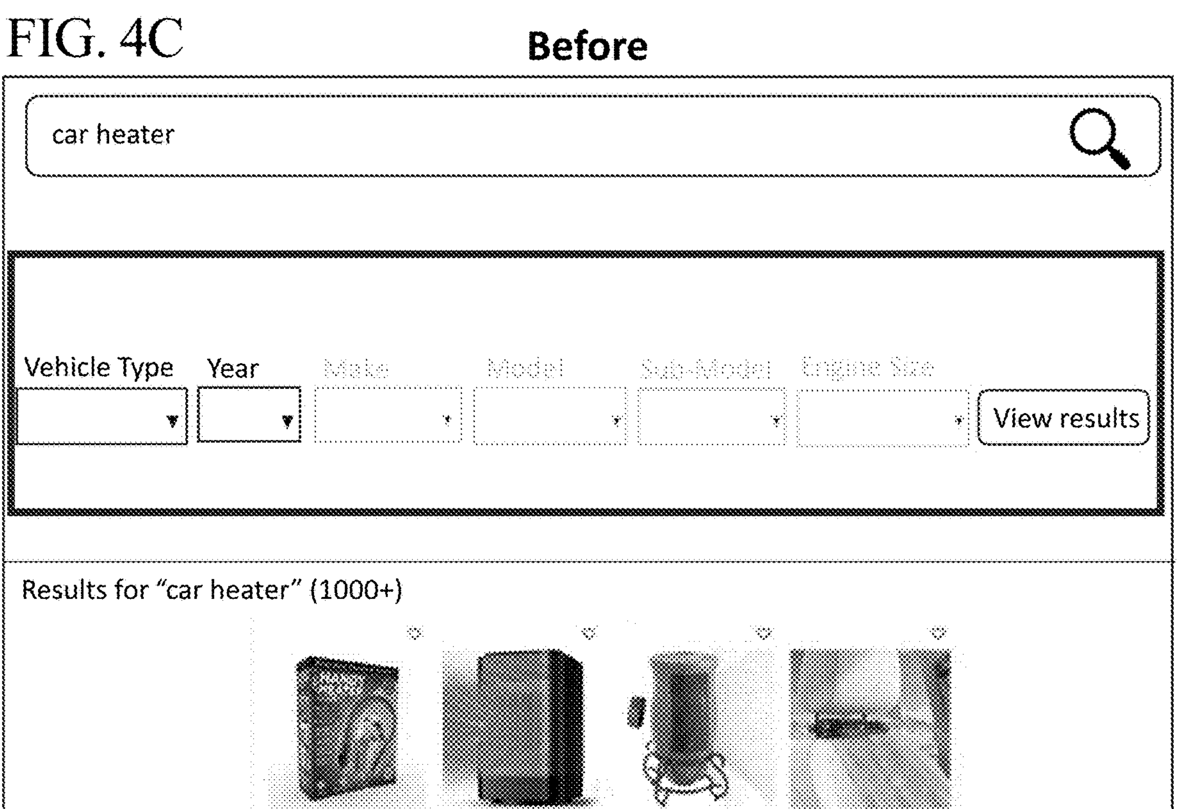
FIGS. 4C and 4D illustrate respective examples of fitment before and after enhanced PTID prediction and accurate fitment using a PTID Understanding Model, according to an example embodiment.
Figure 4D:
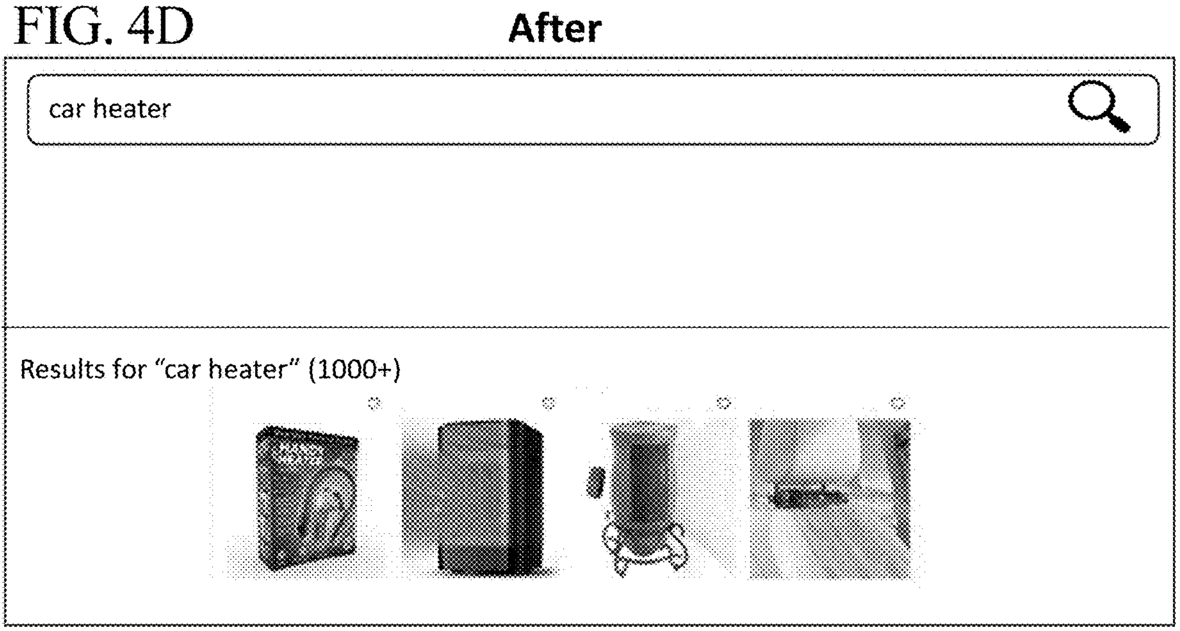

FIGS. 4C and 4D illustrate respective examples of fitment before and after enhanced Part Terminology Identifier (PTID) prediction and accurate fitment using a PTID Understanding Model, according to an example embodiment. The PTID Understanding Model accurately understands the query "car heater" and avoids triggering the fitment widget (FIG. 4D), while the facet rule fails to do so (FIG. 4C). Facet logic fails to avoid triggering the fitment widget for a query like "car heater" because it relies on the frequency of PTIDs in search results rather than understanding the specific context of the query. For example, when a user searches for "car heater," the system might return a variety of heater-related items, such as "engine heater," "seat heater," and "car heater core," based on their frequency in the search results. These irrelevant terms can be prioritized over the specific "car heater" term if they appear more frequently. This happens because facet logic does not understand the specific context or intent behind the query and simply counts how often each PTID appears. Additionally, if there is not a dedicated PTID for "car heater," the system might struggle to accurately identify and prioritize it. While "car" might be a PTID, it is not joined with "heater" in a way that accurately reflects the user's intent. As a result, the fitment widget, which prompts the user to enter their vehicle details, is erroneously triggered because the system mistakenly interprets the query as needing vehicle-specific fitment (FIG. 4C). In contrast, the BERT-based model PTID Understanding Model uses deep learning to understand the context and meaning of the query, accurately identifying "car heater" as the relevant PTID. This approach provides that the fitment widget is not triggered unnecessarily, as the model correctly understands that the query does not require vehicle-specific fitment, thereby improving the accuracy and relevance of the search results (FIG. 4D).

Figure 4E:
FIGS. 4E and 4F illustrate respective examples of fitment before and after enhanced PTID prediction and accurate fitment using a PTID Understanding Model, according to an example embodiment.
Figure 4E:
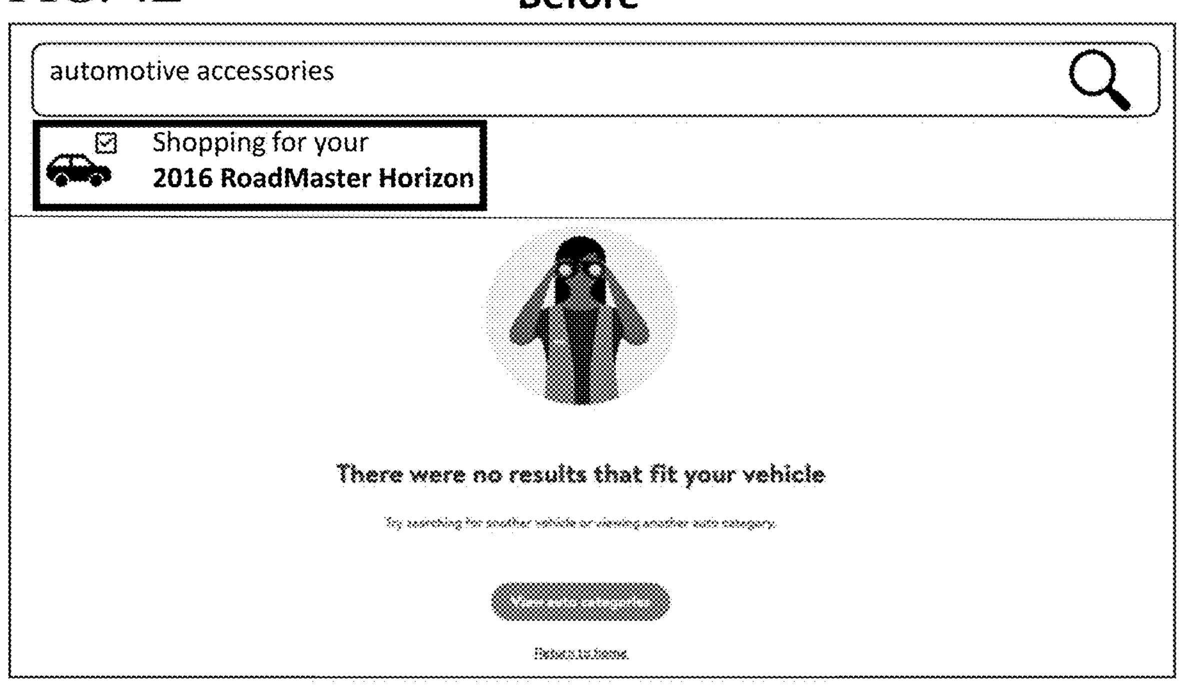
Figure 4F:
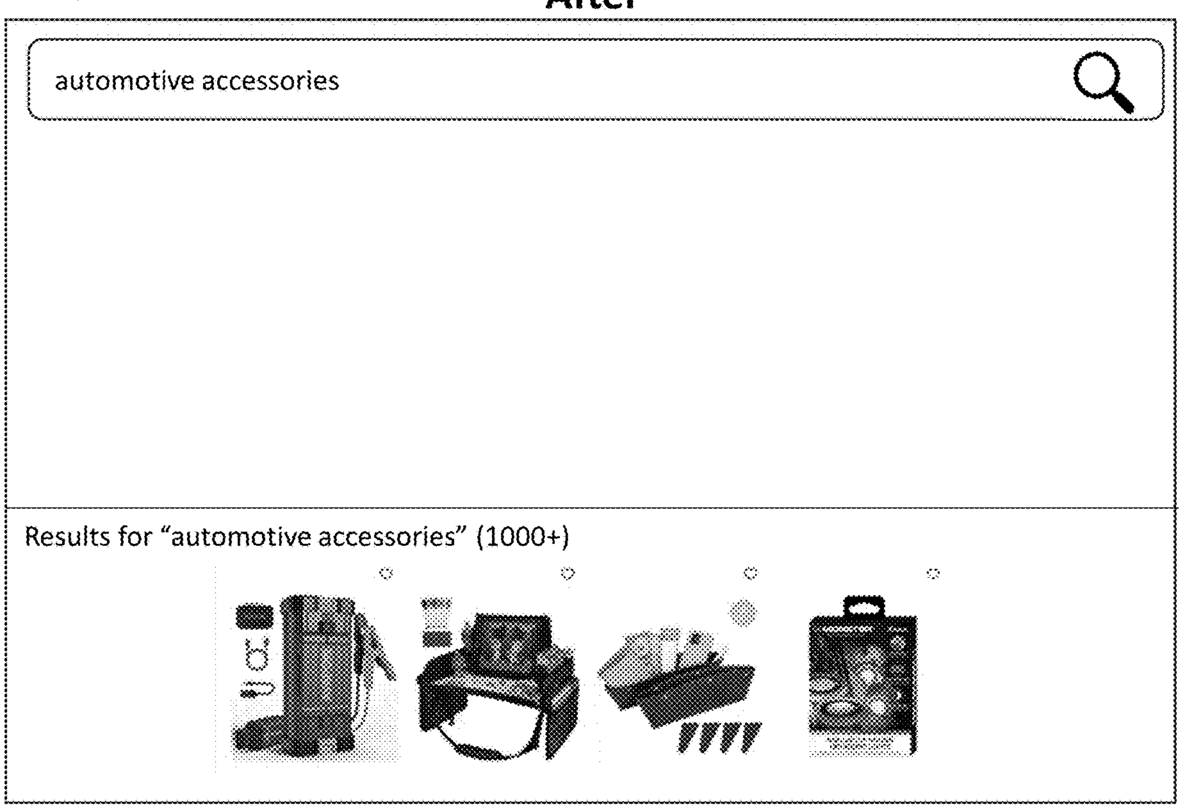

FIGS. 4E and 4F illustrate respective examples of fitment before and after enhanced Part Terminology Identifier (PTID) prediction and accurate fitment using a PTID Understanding Model, according to an example embodiment. The PTID Understanding Model accurately understands the query "automotive accessories" and avoids triggering the fitment widget, showing the user rich results (FIG. 4F). In contrast, the facet rule triggers the fitment widget erroneously (FIG. 4E). Facet logic fails to avoid triggering the fitment widget for a query like "automotive accessories" because it relies on the frequency of PTIDs in search results rather than understanding the specific context of the query. For example, when a user searches for "automotive accessories," the system might return a variety of accessory-related items, such as "seat covers," "floor mats," and "steering wheel covers," based on their frequency in the search results. These irrelevant terms can be prioritized over the general "automotive accessories" term if they appear more frequently. This happens because facet logic does not understand the specific context or intent behind the query and simply counts how often each PTID appears. Additionally, if there is not a dedicated PTID for "automotive accessories," the system might struggle to accurately identify and prioritize it. As a result, the fitment widget, which prompts the user to enter their vehicle details, is erroneously triggered because the system mistakenly interprets the query as needing vehicle-specific fitment. This can lead to an auto-applied filter that results in a null page. In contrast, the BERT-based PTID Understanding Model uses deep learning to understand the context and meaning of the query, accurately identifying "automotive accessories" as the relevant PTID. This approach provides that the fitment widget is not triggered unnecessarily, showing the user rich and relevant results.

FIGS. 4G and 4H illustrate respective examples of fitment before and after enhanced Part Terminology Identifier (PTID) prediction and accurate fitment using a PTID Understanding Model, according to an example embodiment. For the query "spark plugs," both the facet rule and the PTID model trigger the fitment widget. However, the PTID Understanding Model's prediction is more accurate, leading to better filtering results (FIG. 4H), while the facet logic returns a null page due to incorrect PTID prediction (FIG. 4G). Facet logic can fail to provide accurate results for a query like "spark plugs" because it relies on the frequency of PTIDs in search results rather than understanding the specific context of the query. For example, when a user searches for "spark plugs," the system might return a variety of spark plug-related items, such as "spark plug wires," "spark plug sockets," and "spark plug testers," based on their frequency in the search results. These irrelevant terms can be prioritized over the specific "spark plugs" term if they appear more frequently. This happens because facet logic does not understand the specific context or intent behind the query and simply counts how often each PTID appears. As a result, the fitment widget, which prompts the user to enter their vehicle details, is triggered, but the system might apply an incorrect filter due to the wrong PTID prediction, leading to a null page. In contrast, the BERT-based PTID Understanding Model uses deep learning to understand the context and meaning of the query, accurately identifying "spark plugs" as the relevant PTID. This approach provides that the fitment widget is triggered correctly, leading to accurate filtering results and improving the overall user experience.

FIG. 5 illustrates the front elevational view of the computer system that is suitable for implementing the Enhanced Part Terminology Identifier (PTID) Prediction and Accurate Fitment System, according to an example embodiment. Other types of computing systems may also be suitable of implementing techniques described herein.

Figure 6:
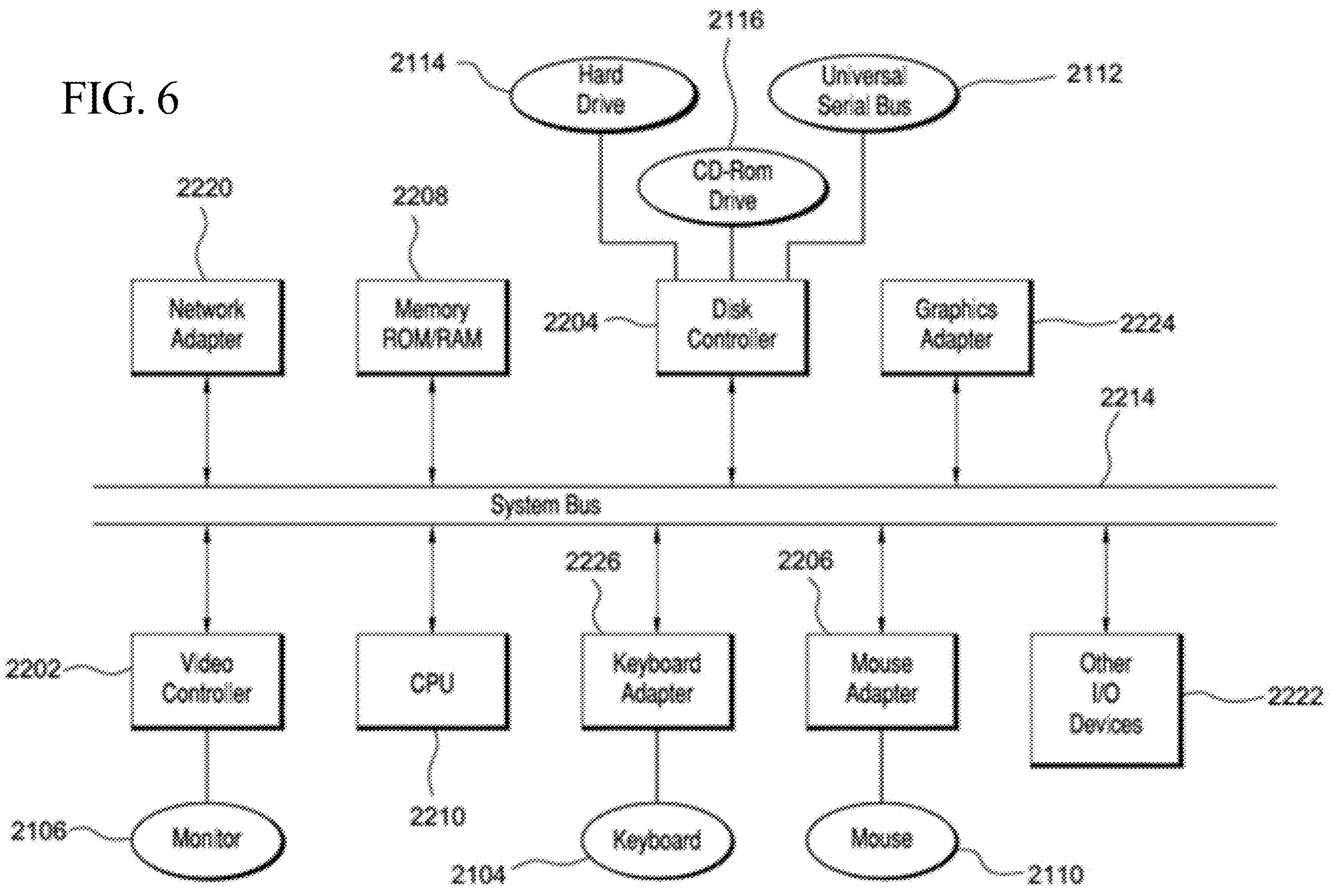
FIG. 6 illustrates a representative block diagram of elements included in circuit boards inside a chassis of a computer system that is suitable for implementing an Enhanced PTID Prediction and Accurate Fitment System, according to an example embodiment.

FIG. 6 illustrates the representative block diagram of elements included in the circuit boards inside the chassis of the computer system that is suitable for implementing an Enhanced Part Terminology Identifier (PTID) Prediction and Accurate Fitment System (such as illustrated and described with reference to FIG. 5), according to an example embodiment.

FIG. 5 illustrates an embodiment of three different types (e.g., a tower server, a laptop, and a smart phone) of a computer system 2100. FIG. 6 illustrates a representative block diagram of elements included on the circuit boards inside a chassis 2102 of computer system 2100. All or a port of computer system 2100 can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 2100 (and its internal components, or one or more elements of computer system 2100) can be suitable for implementing part or all of the techniques described herein. Computer system 2100 can include chassis 2102 containing one or more circuit boards (not shown) and one or more of an input/output port 2112 (e.g., one or more Universal Serial Bus (USB) ports of one or more types (e.g., USB type-A, type-B, type-C, micro-A, micro-B, mini-A, mini-B, etc.), one or more High-Definition Multimedia interface (HDMI) ports, etc.).

A central processing unit (CPU) 2210 is coupled to a system bus 2214. In various embodiments, the architecture of CPU 2210 can be compliant with any of a variety of commercially distributed architecture families. System bus 2214 also can be coupled to memory storage unit 2208 that includes both read only memory (ROM) and random-access memory (RAM). Non-volatile portions of memory storage unit 2208 or the ROM can be encoded with a boot code sequence suitable for restoring computer system 2100 to a functional state after a system reset. In addition, memory storage unit 2208 can include microcode such as a Basic Input-Output System (BIOS). In some examples, the one or more memory storage units of the various embodiments disclosed herein can include memory storage unit 2208, a USB-equipped electronic device (e.g., an external memory storage unit (not shown) coupled to input/output port 2112), hard drive 2114, and/or one or more CD-ROM, DVD, Blu-Ray, or other suitable media, such as media configured to be used in CD-ROM and/or DVD drive 2116 inside chassis 2102 or in a detachable driver coupled to input/output port 2112.

Non-volatile or non-transitory memory storage unit(s) refer to the portions of the memory storage unit(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Example operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further examples of operating systems can include one of the following: (i) the iOS® operating system by Apple Inc. of Cupertino, California, United States of America, or (ii) the Android™ operating system developed by Google, of Mountain View, California, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can include CPU 2210.

Various I/O devices such as a disk controller 2204, a graphics adapter 2224, a video controller 2202, a keyboard adapter 2226, a mouse adapter 2206, a network adapter 2220, and other I/O devices 2222 can be coupled to system bus 2214. Keyboard adapter 2226 and mouse adapter 2206 can be coupled to a keyboard 2104 and a mouse 2110, respectively, of computer system 2100. While graphics adapter 2224 and video controller 2202 are shown as distinct units, video controller 2202 can be integrated into graphics adapter 2224, or vice versa in other embodiments. Video controller 2202 is suitable for refreshing a monitor 2106 to display images on a screen 2108 of computer system 2100. Disk controller 2204 can control hard drive 2114, input/output port 2112, and CD-ROM and/or DVD drive 2116. In other embodiments, distinct units can be used to control each of these devices separately.

In some embodiments, network adapter 2220 can include and/or be implemented as a WNIC (wireless network interface controller) card (not shown) plugged or coupled to an expansion port (not shown) in computer system 2100. In other embodiments, the WNIC card can be a wireless network card built into computer system 2100. A wireless network adapter can be built into computer system 2100 by having wireless communication capabilities integrated into the motherboard chipset (not shown), and/or implemented via one or more dedicated wireless communication chips (not shown), connected through a PCI (peripheral component interconnector) or a PCI express bus of computer system 2100 or input/output port 2112. In other embodiments, network adapter 2220 can include and/or be implemented as a wired network interface controller card (not shown).

Although many other components of computer system 2100 are not shown, such components and their interconnection are well known to those of ordinary skill in the art. Accordingly, further details concerning the construction and composition of computer system 2100 and the circuit boards inside chassis 2102 are not discussed herein.

When computer system 2100 is running, program instructions stored on a USB drive in input/output port 2112, on a CD-ROM or DVD in CD-ROM and/or DVD drive 2116 or in the detachable CD-ROM and/or DVD drive coupled to input/output port 2112, on hard drive 2114, or in memory storage unit 2208 are executed by CPU 2210. A portion of the program instructions, stored on these devices, can be suitable for carrying out all or at least part of the techniques described herein. In various embodiments, computer system 2100 can be reprogrammed with one or more modules, system, applications, and/or databases, such as those described herein, to convert a general-purpose computer to a special purpose computer. For purposes of illustration, programs and other executable program components are shown herein as discrete systems, although it is understood that such programs and components can reside at various times in different storage components of computer system 2100 and can be executed by CPU 2210. Alternatively, or in addition to, the systems and procedures described herein can be implemented in hardware, or a combination of hardware, software, and/or firmware. For example, one or more application predetermined integrated circuits (ASICs) can be programmed to carry out one or more of the systems and procedures described herein. For example, one or more of the programs and/or executable program components described herein can be implemented in one or more ASICs.

Although computer system 2100 is illustrated as a laptop computer, tower server, and smartphone, there can be examples where computer system 2100 can take a different form factor while still having functional elements like those described for computer system 2100. In some embodiments, computer system 2100 can include a single computer, a single server, or a cluster or collection of computers or servers, or a cloud of computers or servers. Typically, a cluster or collection of servers can be used when the demand on computer system 2100 exceeds the reasonable capability of a single server or computer. In certain embodiments, computer system 2100 may include a portable computer, such as a laptop computer. In certain other embodiments, computer system 2100 can include a mobile device, such as a smartphone, smart glasses, smart rings, wearable, virtual reality headset, augmented reality glasses, etc. In certain additional embodiments, computer system 2100 can include an embedded system.

Although the computer-implemented methods described above are with reference to the illustrated flowcharts, it will be appreciated that many other ways of performing the acts associated with the computer-implemented methods can be used. For example, the order of some operations may be changed, and some of the operations described may be optional.

In addition, the computer-implemented methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the computer-implemented methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the computer-implemented method. The computer-implemented methods may also be at least partially embodied in the form of a computer into which computer program code is loaded or executed, such that, the computer becomes a special purpose computer for practicing the computer-implemented methods. When implemented on a general-purpose processor, the computer program code segments configure the processor to create predetermined logic circuits. The computer-implemented methods may alternatively be at least partially embodied in application predetermined integrated circuits for performing the computer-implemented methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although various embodiments of systems and methods for enhanced PTID prediction and accurate fitment using a PTID Understanding Model have been illustrated and described herein, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that various elements of FIGS. 1-6 can be modified, and that the foregoing discussion of certain of these embodiments does not necessarily represent a complete description of all possible embodiments. For example, one or more of the procedures, processes, or activities illustrated and described herein can include different procedures, processes, and/or activities and be performed by many different modules, in many different orders, and/or one or more of the procedures, processes, or activities of FIGS. 1-6 can include one or more of the procedures, processes, or activities of another different one of FIGS. 1-6. As another example, the elements illustrated and described with reference to FIG. 1 can be interchanged and/or otherwise modified.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that includes a list of elements is not necessarily limited to those elements but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.05 second, 0.1 second, 0.02 second, 0.5 second, one second, two seconds, five seconds, or ten seconds.

Replacement of one or more claimed elements constitutes reconstruction and not repair. Additionally, benefits, other advantages, and solutions to problems have been described regarding predetermined embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising a processor and a non-transitory computer-readable medium storing computing instructions that, when executed on the processor, cause the processor to perform operations comprising:

tokenizing a query into tokens;

transforming the tokens into embeddings;

passing the embeddings through a classification layer to produce log its;

applying a sigmoid function to convert the log its into a probability vector for Part Terminology Identifiers (PTIDs) associated with one or more predetermined domains;

filtering the probability vector to retain PTIDs associated with the one or more predetermined domains based on respective probabilities that are at least equal to a predetermined probability threshold, wherein a sum of the respective probabilities is equal to a predetermined sum value;

ranking the PTIDs based on their respective probabilities; and applying business logic to the ranked PTIDs using a PTID Understanding Model to determine a final result that is output to a fitment service, wherein the PTID Understanding Model is pretrained to trigger at least one of a fitment determination process or a query results filter process for the one or more predetermined domains when the final result is output as valid, wherein the business logic comprises:

when a top ranked PTID is invalid and a respective probability is at least equal to a predetermined confidence level, the final result is output as invalid;

when the top ranked PTID is valid and is at least equal to the predetermined confidence level, or when the top ranked PTID is invalid but the respective probability is less than the predetermined confidence level, a sum of all the respective probabilities for valid ranked PTIDs that are included in the probability vector, as filtered, is determined; and when the sum of all the respective probabilities of the valid ranked PTIDs is at least equal to a predetermined cutoff value, the valid ranked PTIDs are included in the final result, wherein the final result is output as valid.

2. The system of claim 1, wherein the predetermined probability threshold is approximately 1%, wherein the predetermined confidence level is approximately 50%, and wherein the predetermined cutoff value is approximately 50%.

3. The system of claim 1, wherein the fitment determination process comprises:

determining a fitment widget to display to a user by verifying that the query relates to the one or more predetermined domains;

retrieving a list of recalled PTIDs corresponding to the valid ranked PTIDs and respective product counts from a presentation service, using a part finder application to identify which of the valid ranked PTIDs are fitment-enabled, selecting fitment-enabled valid ranked PTIDs with highest numbers of associated products, and using the part finder application to obtain a fitment form for the selected fitment-enabled valid ranked PTIDs; and populating the determined fitment widget on a display interface of an e-commerce platform based on the obtained fitment form, prompting the user to input product-specific information.

4. The system of claim 3, wherein the query results filter process comprises:

refining query results by adding a fitment filter parameter to a uniform resource locator, passing the uniform resource locator to a search engine, and incorporating the fitment filter parameter as an additional query parameter, wherein the fitment filter parameter is based on the input product-specific information.

5. The system of claim 1, wherein the PTID Understanding Model comprises a Bidirectional Encoder Representations from Transformers (BERT) model, and wherein the PTID Understanding Model is a weighted single-label multi-class model.

6. The system of claim 1, wherein the operations further comprise:

constructing a training dataset for training the PTID Understanding Model to trigger the at least one of the fitment determination process or the query results filter process for the one or more predetermined domains when the final result is output as valid, wherein the constructing the training dataset comprises:

aggregating user engagement data from search logs, primarily selecting records in which products were added to a cart, indicating positive engagement;

filtering the user engagement data from the search logs to retain training queries and respective training data associated with the one or more predetermined domains;

standardizing the filtered user engagement data by assigning a predetermined placeholder value to included products without valid PTIDs; and converting the standardized and filtered user engagement data into "query-PTID" relationships suitable for the training the PTID Understanding Model that is a weighted single-label multi-class model.

7. The system of claim 6, wherein the operations further comprise:

preprocessing the training queries by tokenizing and converting the training queries into training embeddings using a Bidirectional Encoder Representations from Transformers (BERT) model included in the PTID Understanding Model;

adding a fully connected layer to the BERT model to convert the training embeddings into training predictions for predetermined training PTIDs; and outputting predicted training probability distributions for the predetermined training PTIDs to rank the predetermined training PTIDs according to respective predicted probabilities for each of the training queries.

8. The system of claim 7, wherein the operations further comprise:

utilizing GPU acceleration for the training the PTID Understanding Model to trigger the at least one of the fitment determination process or the query results filter process for the one or more predetermined domains when the final result is output as valid;

optimizing hyperparameters of the PTID Understanding Model, wherein the hyperparameters comprise learning rate, batch size, and weight decay; and using a cross-entropy loss function to improve accuracy of PTIDs predicted by the PTID Understanding Model by comparing the predicted training probability distributions with true PTID labels.

9. The system of claim 8, wherein the operations further comprise:

selecting a subset of the training queries from the constructed training dataset to create a test sample;

using a remainder of the training queries from the training dataset for the training the PTID Understanding Model to trigger the at least one of the fitment determination process or the query results filter process for the one or more predetermined domains when the final result is output as valid; and testing the PTID Understanding Model that is pretrained on the test sample to evaluate an accuracy of the PTIDs predicted by the PTID Understanding Model.

10. A computer-implemented method comprising:

tokenizing a query into tokens;

transforming the tokens into embeddings;

passing the embeddings through a classification layer of a Bidirectional Encoder Representations from Transformers (BERT) model to produce log its;

applying a sigmoid function to convert the log its into a probability vector for Part Terminology Identifiers (PTIDs) associated with one or more predetermined domains;

filtering the probability vector to retain PTIDs based on respective probabilities that are at least equal to a predetermined probability threshold, wherein a sum of the respective probabilities is equal to a predetermined sum value;

ranking the PTIDs based on their respective probabilities;

applying business logic to the ranked PTIDs using a PTID Understanding Model to determine a final result that is output to a fitment service, wherein the PTID Understanding Model is pretrained to trigger at least one of a fitment determination process or a query results filter process for the one or more predetermined domains when the final result is output as valid, wherein the business logic comprises:

when a top ranked PTID is invalid and a respective probability is at least equal to a predetermined confidence level, the final result is output as invalid;

when the top ranked PTID is valid and is at least equal to the predetermined confidence level, or when the top ranked PTID is invalid but the respective probability is less than the predetermined confidence level, a sum of all the respective probabilities for valid ranked PTIDs that are included in the probability vector, as filtered, is determined; and when the sum of all the respective probabilities of the valid ranked PTIDs is at least equal to a predetermined cutoff value, the valid ranked PTIDs are included in the final result, wherein the final result is output as valid.

11. The computer-implemented method of claim 10, wherein the predetermined probability threshold is approximately 1%, wherein the predetermined confidence level is approximately 50%, and wherein the predetermined cutoff value is approximately 50%.

12. The computer-implemented method of claim 10, wherein the fitment determination process comprises:

determining a fitment widget to display to a user by verifying that the query relates to the one or more predetermined domains;

retrieving a list of recalled PTIDs corresponding to the valid ranked PTIDs and respective product counts from a presentation service, using a part finder application to identify which of the valid ranked PTIDs are fitment-enabled, selecting fitment-enabled valid ranked PTIDs with highest numbers of associated products, and using the part finder application to obtain a fitment form for the selected fitment-enabled valid ranked PTIDs; and populating the determined fitment widget on a display interface of an e-commerce platform based on the obtained fitment form, prompting the user to input product-specific information.

13. The computer-implemented method of claim 12, wherein the query results filter process comprises:

refining query results by adding a fitment filter parameter to a uniform resource locator, passing the uniform resource locator to a search engine, and incorporating the fitment filter parameter as an additional query parameter, wherein the fitment filter parameter is based on the input product-specific information.

14. The computer-implemented method of claim 10, wherein the PTID Understanding Model comprises the BERT model, and wherein the PTID Understanding Model is a weighted single-label multi-class model.

15. The computer-implemented method of claim 10, further comprising:

constructing a training dataset for training the PTID Understanding Model to trigger the at least one of the fitment determination process or the query results filter process for the one or more predetermined domains when the final result is output as valid, wherein the constructing the training dataset comprises:

aggregating user engagement data from search logs, primarily selecting records in which products were added to a cart, indicating positive engagement;

filtering the user engagement data from the search logs to retain training queries and respective training data associated with the one or more predetermined domains;

standardizing the filtered user engagement data by assigning a predetermined placeholder value to included products without valid PTIDs; and converting the standardized and filtered user engagement data into "query-PTID" relationships suitable for the training the PTID Understanding Model that is a weighted single-label multi-class model.

16. The computer-implemented method of claim 15, further comprising:

preprocessing the training queries by tokenizing and converting the training queries into training embeddings using the BERT model included in the PTID Understanding Model;

adding a fully connected layer to the BERT model to convert the training embeddings into training predictions for predetermined training PTIDs; and outputting predicted training probability distributions for the predetermined training PTIDs to rank the predetermined training PTIDs according to respective predicted probabilities for each of the training queries.

17. A non-transitory computer-readable medium storing computing instructions that, when executed on a processor, cause the processor to perform operations comprising a computer-implemented method, the computer-implemented method comprising:

tokenizing a query into tokens;

transforming the tokens into embeddings;

passing the embeddings through a classification layer to produce log its;

applying a sigmoid function to convert the log its into a probability vector for Part Terminology Identifiers (PTIDs) associated with one or more predetermined domains;

filtering the probability vector to retain PTIDs based on respective probabilities that are at least equal to a predetermined probability threshold, wherein a sum of the respective probabilities is equal to a predetermined sum value;

ranking the PTIDs based on their respective probabilities;

applying business logic to the ranked PTIDs using a PTID Understanding Model to determine a final result that is output to a fitment service, wherein the PTID Understanding Model is pretrained to trigger at least one of a fitment determination process or a query results filter process for the one or more predetermined domains when the final result is output as valid, wherein the business logic comprises:

when a top ranked PTID is invalid and a respective probability is at least equal to a predetermined confidence level, the final result is output as invalid;

when the top ranked PTID is valid and is at least equal to the predetermined confidence level, or when the top ranked PTID is invalid but the respective probability is less than the predetermined confidence level, a sum of all the respective probabilities for valid ranked PTIDs that are included in the probability vector, as filtered, is determined; and when the sum of all the respective probabilities of the valid ranked PTIDs is at least equal to a predetermined cutoff value, the valid ranked PTIDs are included in the final result, wherein the final result is output as valid.

18. The non-transitory computer-readable medium of claim 17, wherein the predetermined probability threshold is approximately 1%, wherein the predetermined confidence level is approximately 50%, and wherein the predetermined cutoff value is approximately 50%.

19. The non-transitory computer-readable medium of claim 18, wherein the fitment determination process comprises:

determining a fitment widget to display to a user by verifying that the query relates to the one or more predetermined domains;

retrieving a list of recalled PTIDs corresponding to the valid ranked PTIDs and respective product counts from a presentation service, using a part finder application to identify which of the valid ranked PTIDs are fitment-enabled, selecting fitment-enabled valid ranked PTIDs with highest numbers of associated products, and using the part finder application to obtain a fitment form for the selected fitment-enabled valid ranked PTIDs; and populating the determined fitment widget on a display interface of an e-commerce platform based on the obtained fitment form, prompting the user to input product-specific information, and wherein the query results filter process comprises:

refining query results by adding a fitment filter parameter to a uniform resource locator, passing the uniform resource locator to a search engine, and incorporating the fitment filter parameter as an additional query parameter, wherein the fitment filter parameter is based on the input product-specific information.

* * * * *